United States Patent [19]

Shattuck et al.

[11] Patent Number: 5,480,260

[45] Date of Patent: Jan. 2, 1996

[54] GROUND WATER COLLECTION METHOD AND APPARATUS

[75] Inventors: Dennis R. Shattuck, Burlington, Ky.; Eric C. Volpenhein, Cincinnati, Ohio

[73] Assignee: Dames & Moore, Cincinnati, Ohio

[21] Appl. No.: 94,937

[22] Filed: Jul. 20, 1993

[51] Int. Cl.⁶ .................................................. E02B 11/00
[52] U.S. Cl. ............................ 405/36; 405/52; 405/154; 405/150.1
[58] Field of Search ................................ 405/52, 36, 43, 405/150.1, 154

[56] References Cited

U.S. PATENT DOCUMENTS

| | | | |
|---|---|---|---|
| 4,610,120 | 9/1986 | Canavesi et al. | 405/150.1 X |
| 4,637,754 | 1/1987 | Wood | 405/150.1 |
| 4,695,188 | 9/1987 | Pulkkinen | 405/150.1 X |
| 4,770,562 | 9/1988 | Muller et al. | 405/154 |
| 5,261,764 | 11/1993 | Walles | 405/52 |

*Primary Examiner*—David H. Corbin
*Attorney, Agent, or Firm*—Frost & Jacobs

[57] ABSTRACT

A method and system for collecting ground water segregated from storm water are provided in which an existing storm sewer pipe may be retrofitted by forming a ground water channel and a storm water channel therein. The two channels may be formed by disposing a lining within the existing pipe which segregates the pipe into two distinct flow passageways. A new pipe may also be similarly used for collection of ground water.

4 Claims, 12 Drawing Sheets

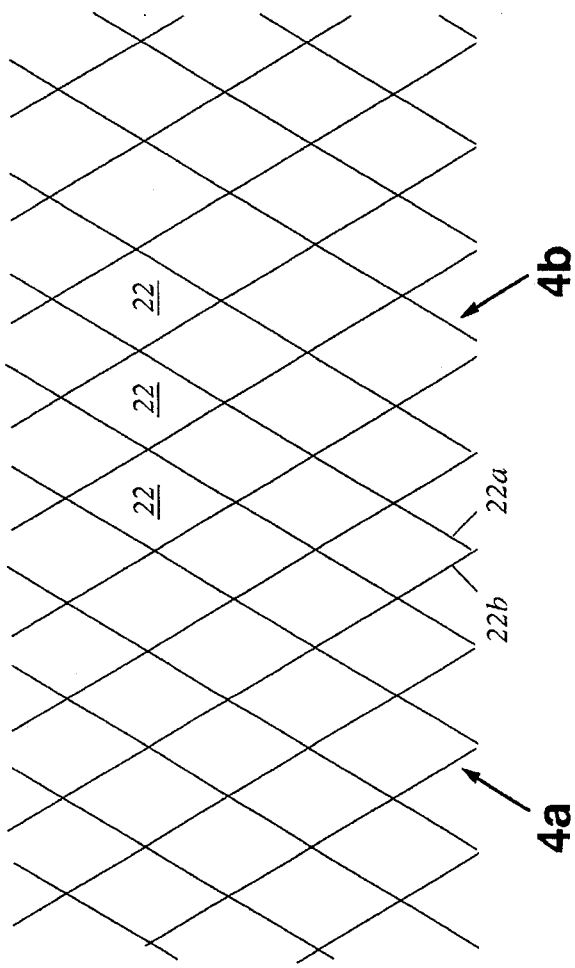
FIG. 4b
FIG. 4a
FIG. 4

GROUND WATER COLLECTION METHOD AND APPARATUS

TECHNICAL FIELD

The present invention relates generally to a method and apparatus for the collection of contaminated ground water, and is particularly directed to the collection of contaminated ground water which may be intercepted by an existing storm sewer system and the segregation of the contaminated ground water from storm water flowing through the existing storm sewer system. The invention will be specifically disclosed in connection with the formation of a ground water collection channel substantially within an existing storm sewer pipe in conjunction with an in situ formed lining disposed within the existing storm sewer pipe to form a segregated storm sewer channel/flow passageway.

BACKGROUND OF THE INVENTION

Contaminated ground water can present several problems to past or present property owners or lessees. In some cases, it is the responsibility of the property owner to collect and treat the contaminated ground water to prevent it from migrating to adjacent areas. In instances where existing underground storm sewer pipes are located or pass through saturated areas of contaminated ground water, the contaminated ground water may infiltrate the storm sewer pipe through the cracks and joints. The infiltrated contaminated ground water will, by itself or mixed with storm water, flow to the outfall of the storm sewer system, bringing the contaminated ground water to the surface.

There are federal, state, and local regulations relating to required treatment of such contaminated ground water. The concentration of contaminants in infiltrated ground water flowing through and out of storm sewer pipes decreases when it mixes with the relatively higher volume of storm water flowing periodically through the storm sewer pipe. While dilution of the contaminants may be somewhat beneficial, such mixing creates relatively large volumes of contaminated water which must be treated, requiring a substantial increase in the capacity of any treatment facility. Thus, it is undesirable to allow the mixing of contaminated ground water with storm water.

Beside completely removing and replacing the preexisting storm sewer pipe, one way of segregating contaminated ground water from storm water is to line the preexisting storm water pipe with an impermeable lining. Pre-formed slip linings are well known in the art. In situ formed linings are also known, such as described in U.S. Pat. No. 4,637,754, which is incorporated herein by reference, and allow the formation of an impermeable storm water channel/flow passageway with a minimal impact on the effective flow area. Neither of these alone provide for the collection of ground water.

As mentioned above, segregation of contaminated ground water from storm water frequently must be accompanied by collection and treatment of the contaminated ground water. Various methods are known in the prior art for collection of ground water. For example, horizontal or vertical wells may be bored into the saturated area and the contaminated ground water withdrawn and treated. However, horizontal boring is expensive and inaccurate. The effectiveness of vertical boring depends upon the nature of the aquifer and the soil. For compact soil conditions, numerous and closely spaced vertical wells are required, which is expensive. Another alternative in the prior art is trenching to provide access to the contaminated ground water, as well as the use of a ground water collecting pipe buried parallel to the existing storm sewer lines.

Most of these methods are relatively expensive, and are impractical when the contaminated ground water and/or existing storm sewer pipe are located underneath existing buildings. Thus, them is a need for an economical way to collect contaminated ground water and maintain it segregated from storm water.

SUMMARY OF THE INVENTION

Accordingly, it is a primary object of the present invention to provide a method and apparatus for collecting contaminated ground water and conveying it, segregated from storm water, to a location for treatment.

It is another object of the present invention to provide a method and structure for utilizing existing storm sewer pipes to collect, convey and segregate contaminated ground water.

It is yet another object of the present invention to provide a method and structure for collecting and segregating ground water which improves or has minimal impact on the capacity of the existing storm water conveyance.

A still further object of the present invention is to provide a method and structure for collecting and segregating ground water which minimizes the disruption of the site and the need for demolition and reconstruction of existing facilities.

Yet another object of the present invention is to facilitate permitting for effluent discharge or storm water discharge by improving effluent quality of the existing outflow.

Another object of the present invention is to reduce the potential for discharge of contaminated ground water into the environment.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described below, a method and system is provided for forming a ground water collection channel within existing storm sewer pipes, lining the pipe to segregate the contaminated ground water from storm water, and conveying the contaminated ground water to a treatment facility.

In accordance with another aspect of the present invention, a ground water passageway and a storm water passageway are defined within an existing under ground pipe.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 2:
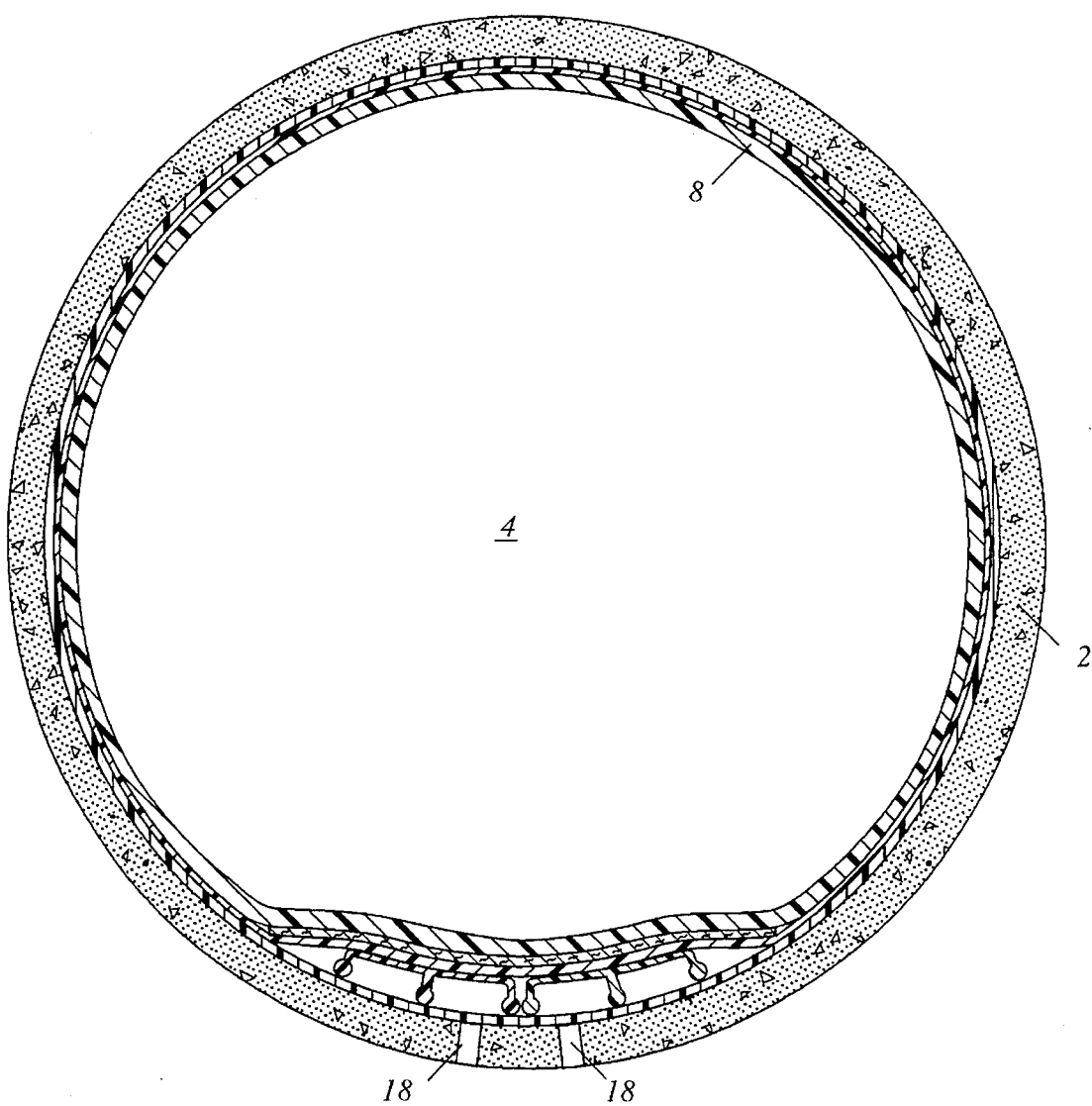
FIG. 2 is a cross-sectional view taken along line 2—2 of FIG. 1.

FIG, 3 is an enlarged, fragmentary view of the ground water channel as illustrated in FIG. 2.

FIG. 4 is a plan view of the drainage net.

FIGS. 4a and 4b are side views of the drainage net taken along lines 4a and 4b, respectively, of FIG. 4.

Figure 1:
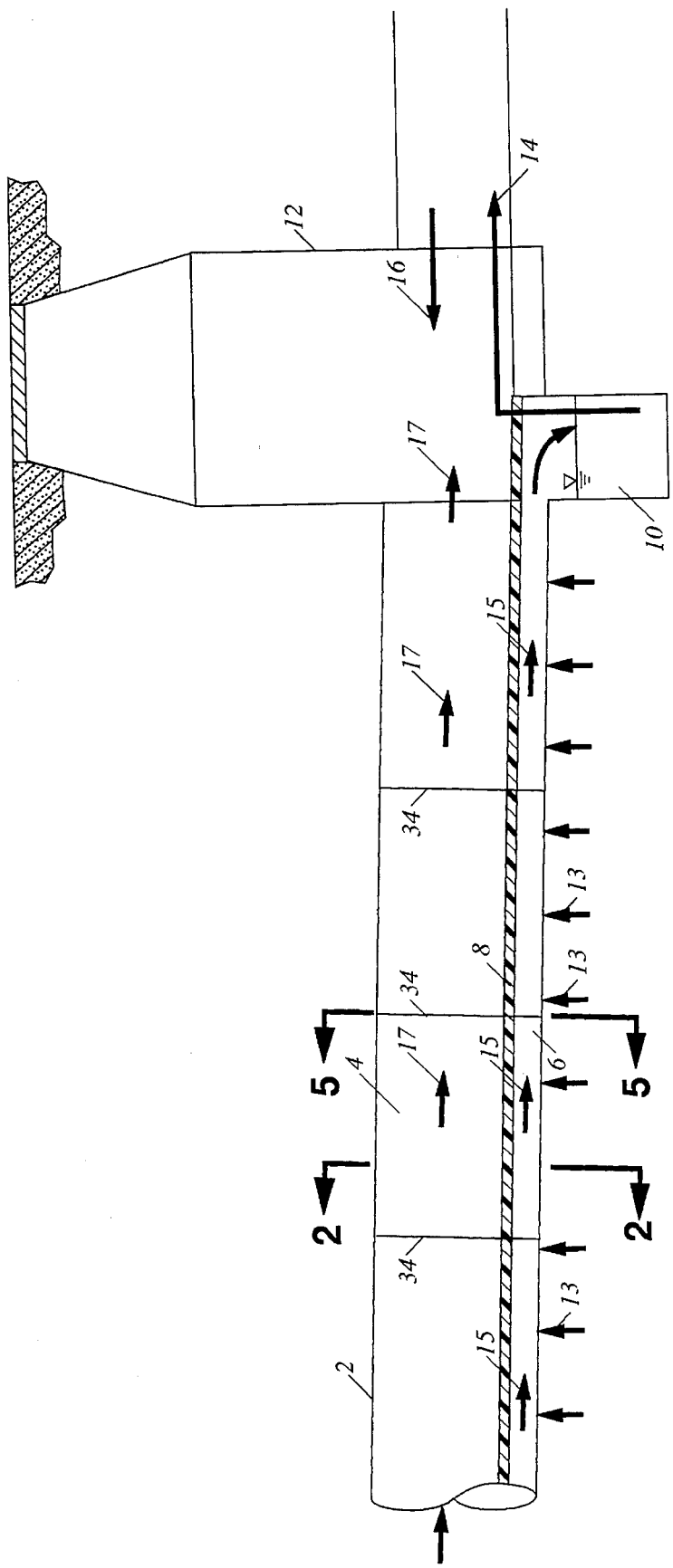
FIG. 1 is a diagrammatic, fragmentary, elevational view of the ground water collection, segregation and conveying system of the present invention.
Figure 5:
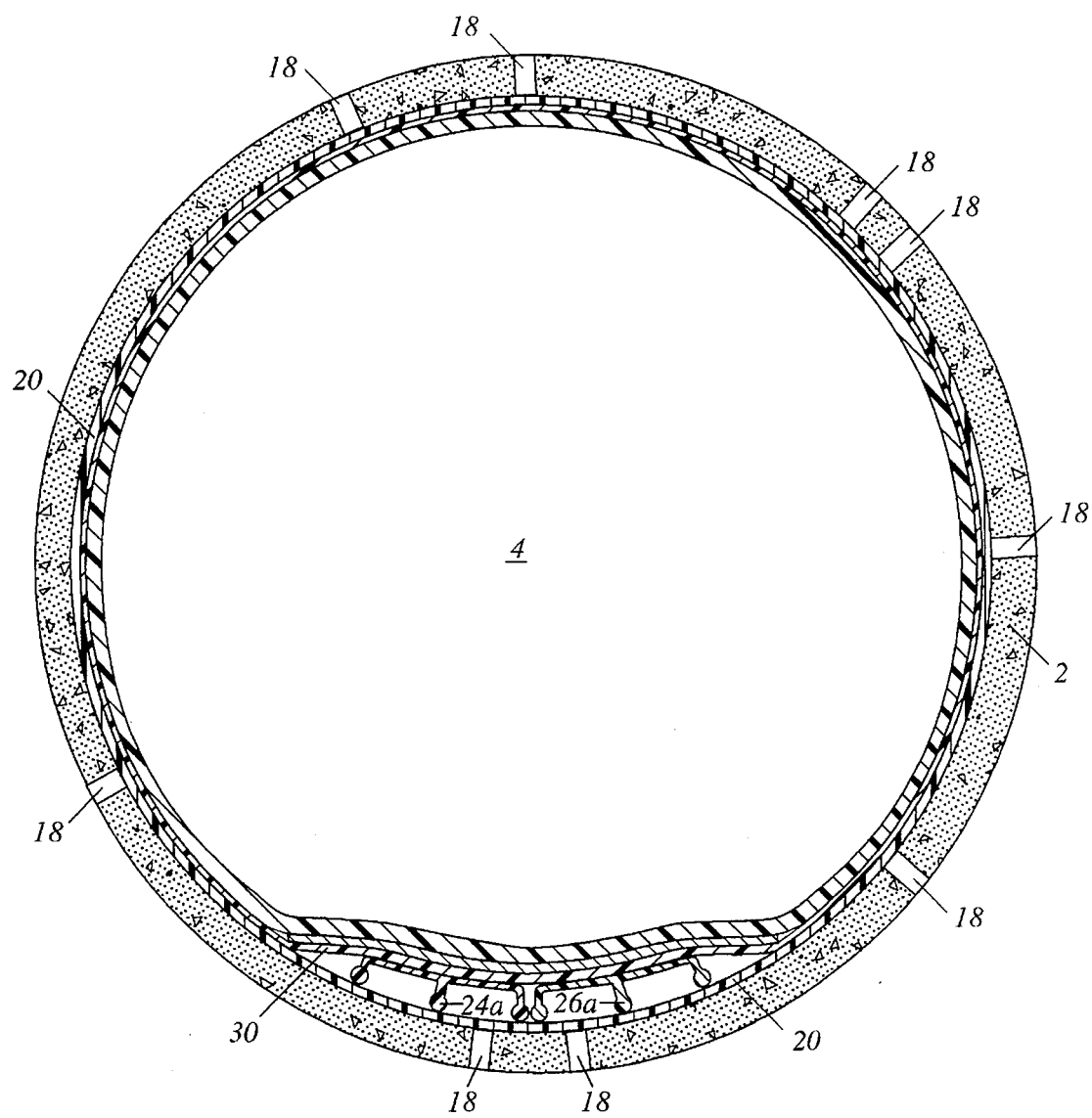

FIG. 5 is a cross-sectional view at a joint taken along line 5—5 of FIG. 1.

Figure 6:
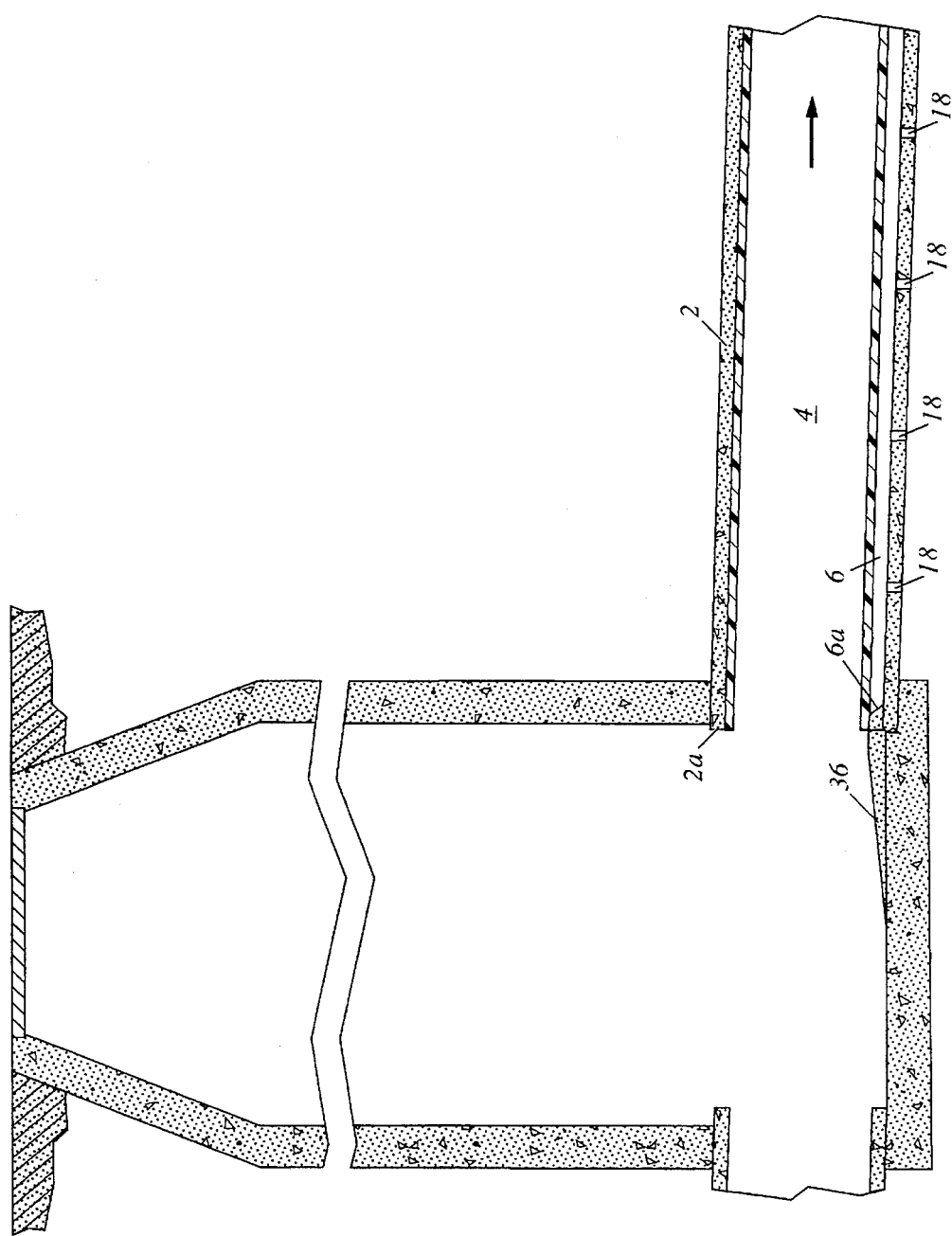

FIG. 6 is a diagrammatic elevational view of an existing manhole and storm sewer pipe showing the beginning of the ground water channel.

Figure 7:
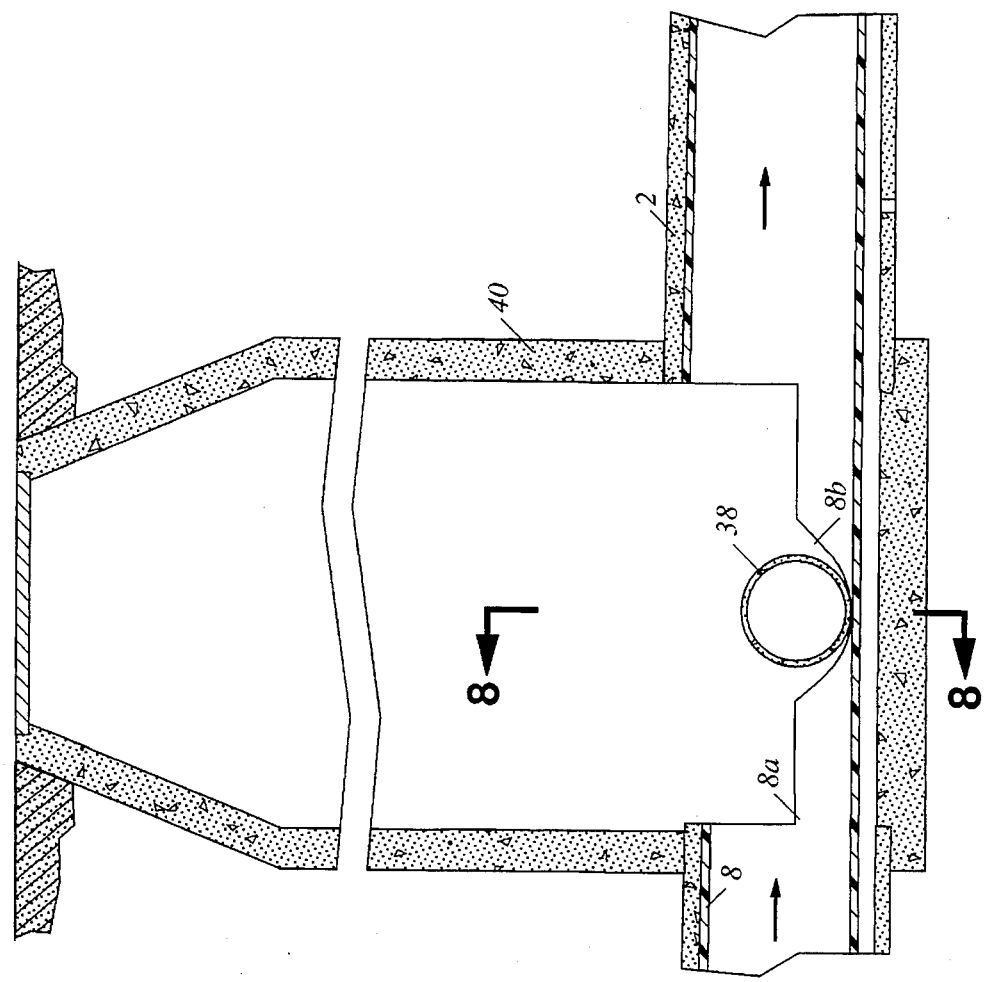

FIG. 7 is a diagrammatic, fragmentary elevational view showing the intersection of laterals into the existing storm sewer system at a manhole.

Figure 8:
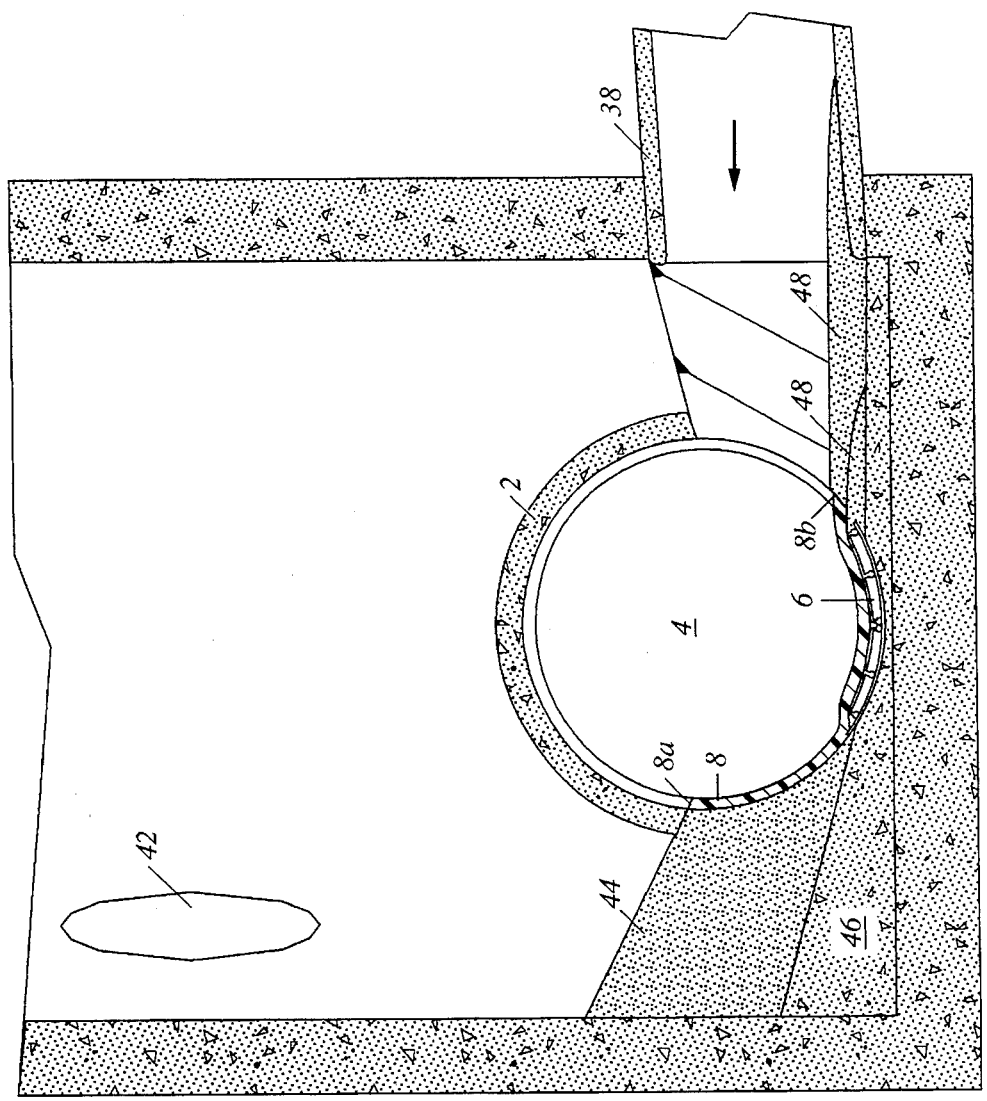

FIG. 8 is a cross-sectional view taken along line 8—8 of FIG. 7.

Figure 9:
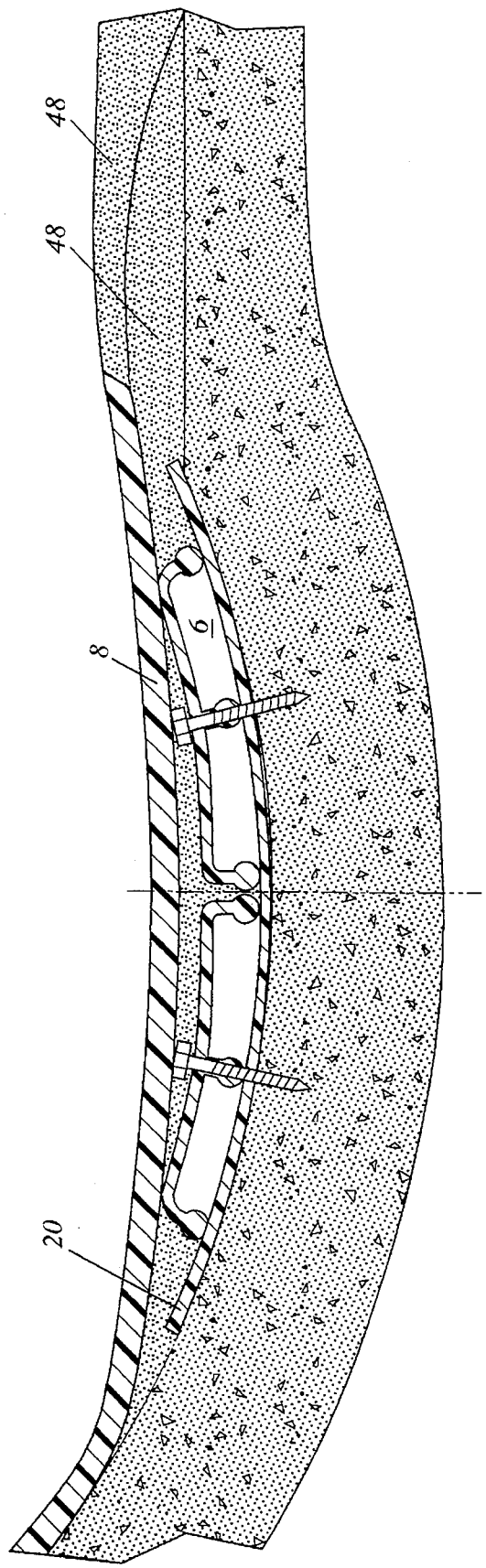

FIG. 9 is an enlarged cross-sectional view of the ground water channel shown in FIG. 8.

Figure 10:
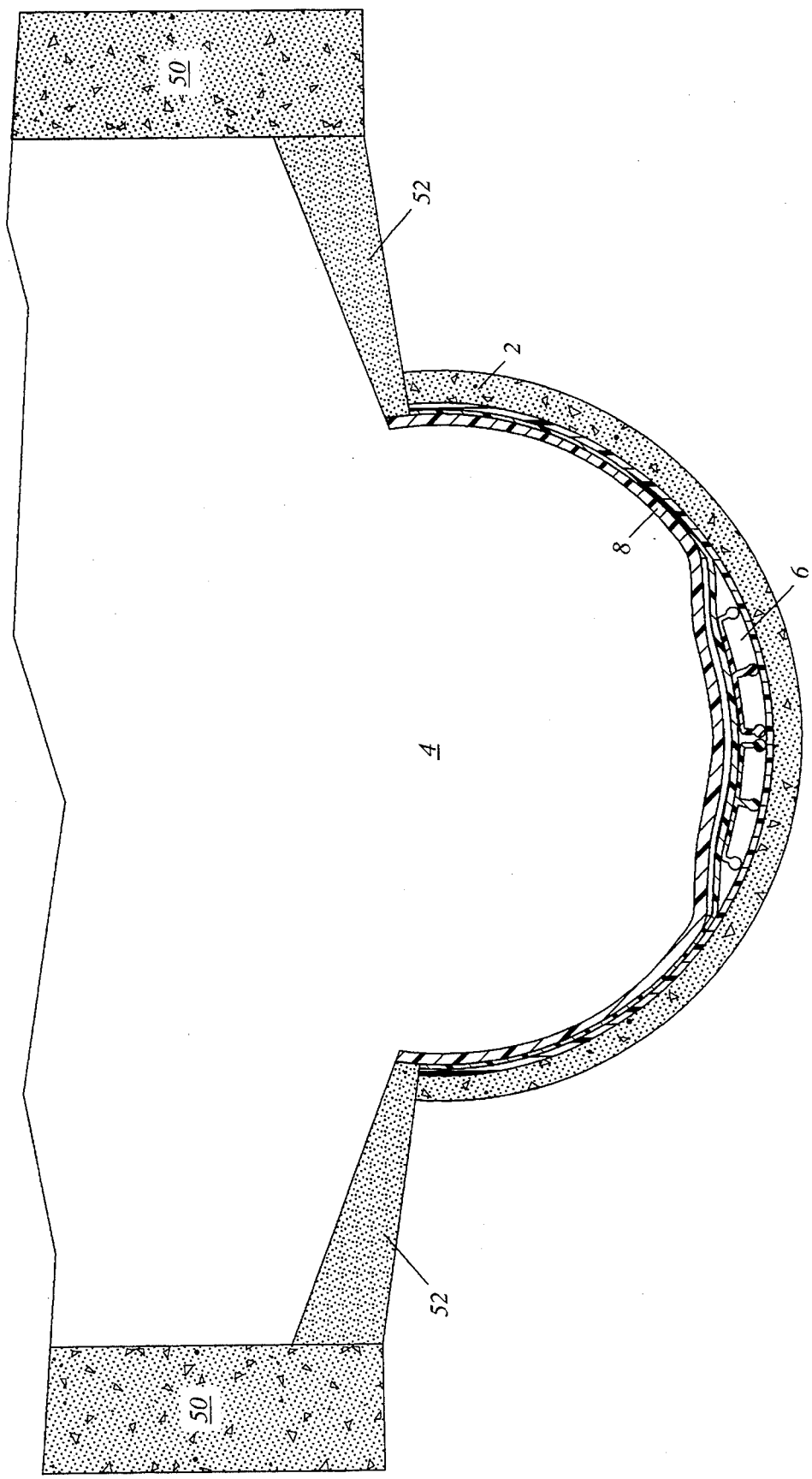

FIG. 10 is a cross-sectional view of the storm water channel/passageway passing through an existing manhole.

Figure 11:
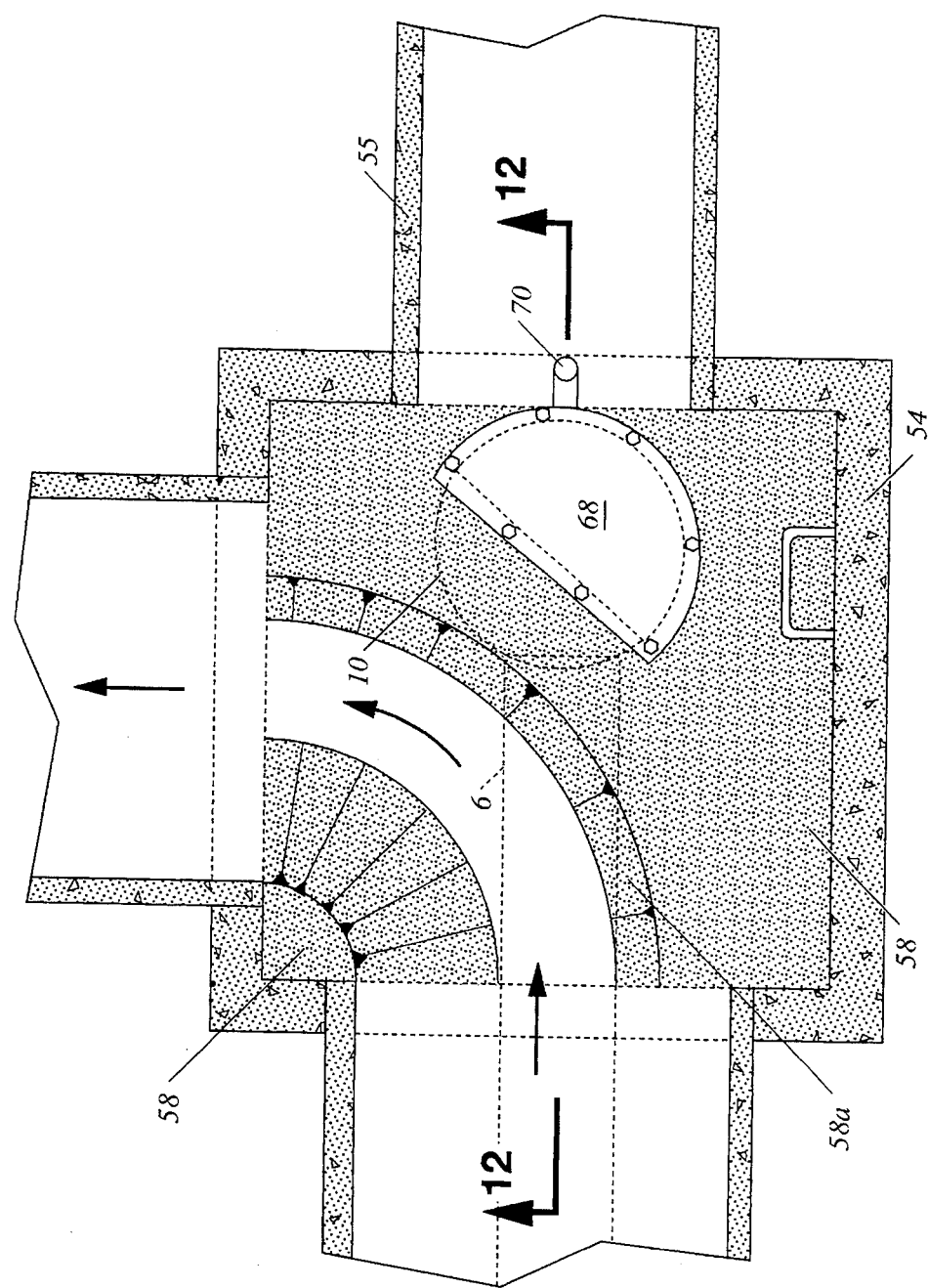

FIG. 11 is a diagrammatic, plan view of an existing manhole in which the sump is being located.

Figure 12:
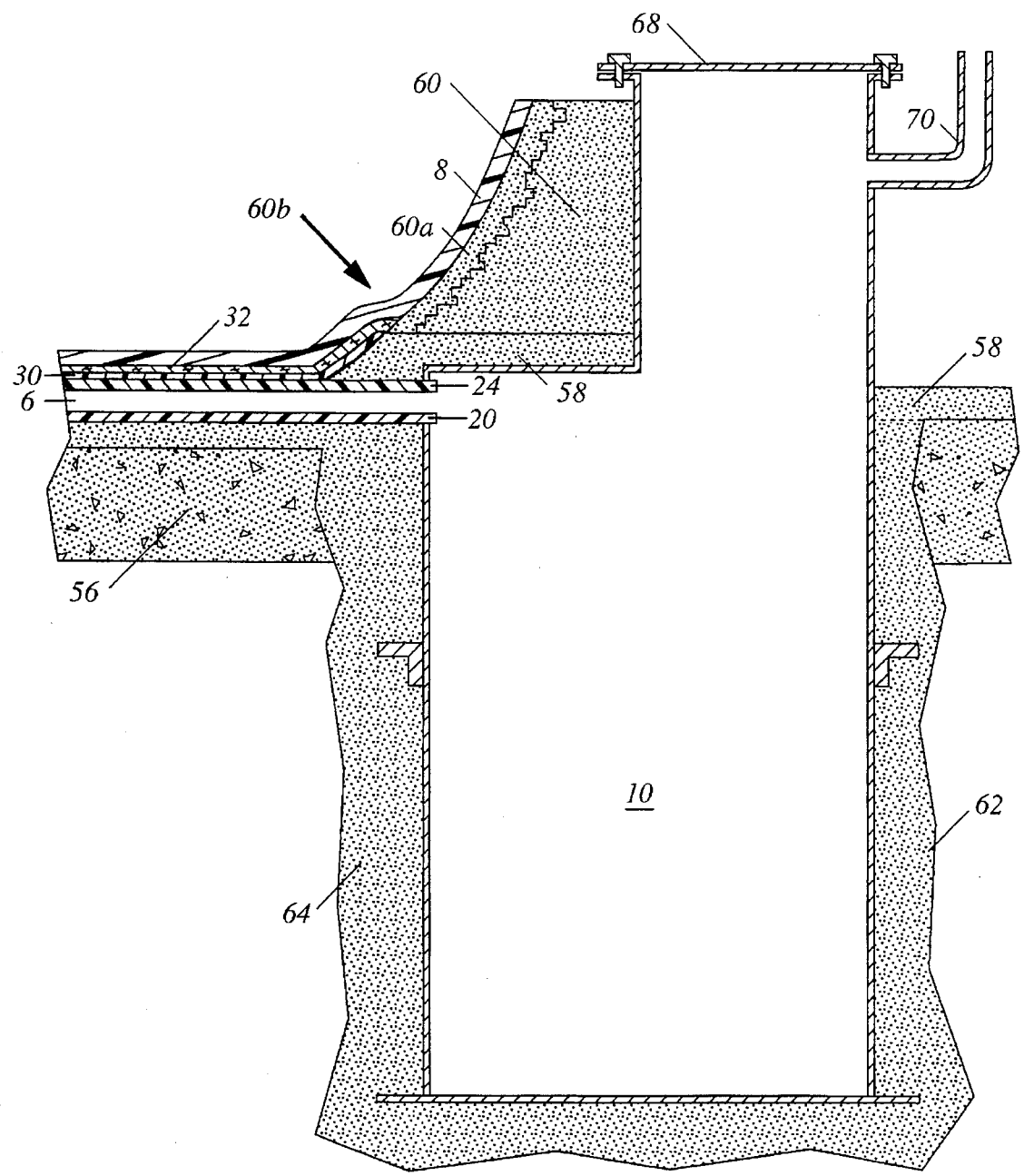

FIG. 12 is a diagrammatic cross-sectional view of the sump taken along line 12—12 of FIG. 11.

Reference will now be made in detail to the present preferred embodiment of the invention, an example of which is illustrated in the accompanying drawings.

DETAILED DESCRIPTION OF THE PREFERRED EMBODIMENT

Referring now to the drawings, FIG. 1 is a diagrammatic, fragmentary view of a ground water collection, segregation and conveying system according to the present invention. Existing storm sewer pipe 2 has been separated into storm water channel/passageway 4 and ground water channel 6 by impermeable lining 8. Ground water channel 6 terminates at sump 10, which is illustrated as being located at the bottom of existing manhole 12.

Ground water, as indicated generally by arrows 13, infiltrates exiting pipe 2, and flows through ground water channel 6, as indicated generally by arrows 15, into sump 10 from which it is pumped to a treatment unit as indicated by arrow 14. Treated ground water may be returned from the treatment unit to storm water channel passageway 4 as indicated by arrow 16. Since the ground water is segregated from the storm water flow, as indicated generally by arrows 17, only the volume of ground water flowing into and through ground water channel 6 must be treated.

Figure 3:
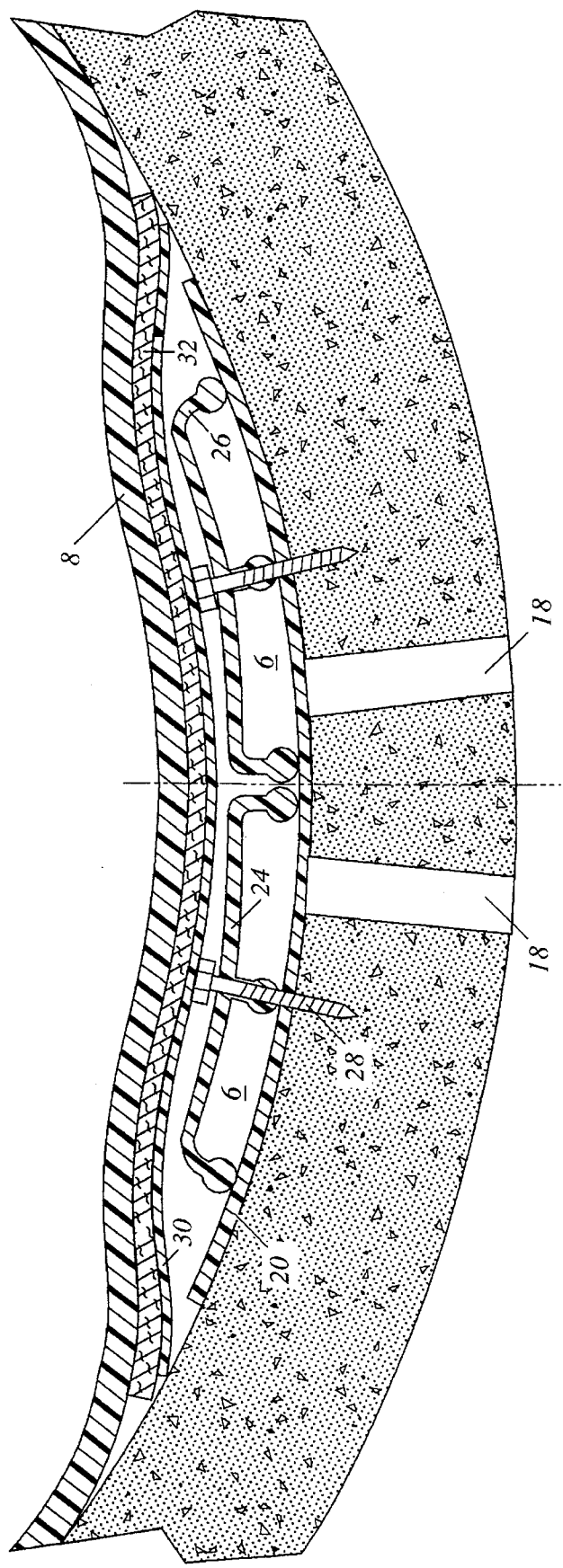

Referring now to FIG. 2, which is a cross-sectional view taken along line 2—2 of FIG. 1, and to FIG. 3, which is an enlarged fragmentary view of ground water channel 6 of FIG. 2, ground water channel 6 is formed along the invert of existing storm sewer pipe 2, between impermeable lining 8 and existing pipe 2. Ground water channel 6 is formed by first drilling or otherwise forming a plurality of spaced apart holes 18 along the length of existing pipe 2, generally at any locations where contaminated ground water is in contact with the outside of existing pipe 2, in order to promote the inward flow/collection of ground water. In the preferred embodiment, based on specific flow calculations, a series of one-inch diameter holes were drilled at approximately 3 foot centers along the invert of pipe 2. More or less core holes may be used, depending upon the specific ground water conditions.

High density polyethylene (HDPE) drainage net 20 is disposed along the length of the invert of existing pipe 2. Drainage net 20 is also disposed between lining 8 and pipe 2 adjacent any holes 18, cracks and joints, extending downwardly about the circumference of lining 8 to provide a plurality of flow paths down to ground water channel 6. Drainage net 20, as illustrated in FIG. 4 is a criss-cross mesh of ribs 22a and 22b which define a plurality of openings 22. FIG. 4a is a side view taken along arrow 4a of FIG. 4, while FIG. 4b is a side view taken along arrow 4b of FIG. 4. This configuration reduces the impact of blockages on the flow of water along drainage net 20. Drainage net 20 is available from the Tensar Corporation, Morrow, Ga. 30260. In the preferred embodiment, Tensar's DN-1(NS-1100) net was used.

Two side-by-side inverted channels 24, 26 are disposed overlying drainage net 20 along the invert, extending the length of existing pipe 2, secured in place to pipe 2 by a plurality of fasteners 28. In the preferred embodiment, fasteners 28 were TAPCON® Blue Max® self threading masonry anchors from Illinois Tool Works of Itasca, Ill. Each channel includes a respective longitudinal rib 24a and 26a (see FIG. 5) and comprises individual sections which are aligned end to end along the length of the existing pipe 2. Drainage net 20 functions to distribute flow among the available channels more uniformly so as to render the system less susceptible to plugging by debris and deposits.

In the preferred embodiment, channels 24 and 26 were PolyLock sections manufactured by SLT North America, Inc. out of HDPE. The PolyLock channels were selected because they are economical, commercially available, and provide a low profile pathway that minimally reduces the effective cross sectional area available for the storm water flow. The PolyLock channels are also chemically and thermally compatible with the process for forming lining 8 in situ, as described below. The size and side-by-side arrangement of the PolyLock channels were selected to provide sufficient capacity for ground water channel 6 to collect and convey the anticipated flow rate of the contaminated ground water. In the specific embodiment described this was calculated to be 20 GPM.

Liner 30, made of 60 mil HDPE, is disposed overlying channels 24 and 26. Liner 30 extends the length of existing pipe 2, having a width that extends beyond the lateral edges of drainage net 20.

Felt layer 32 is disposed overlying liner 30, running the length of existing pipe 2. Felt layer 32 is substantially coextensive with liner 30.

Impermeable lining 8 is then formed in situ within existing pipe 2, substantially in accordance with the teaching of the '754 patent. The installation process of lining 8 consists of inverting a felt tube impregnated with a thermal setting resin into an existing manhole. The tube is then filled with water and allowed to flow the course of the sewer. The weight of the water inverts the tube, turning it inside out and pressing the tube firmly against the inside walls of existing pipe 2. After the tube is inverted through existing pipe 2 to the desired length, the water used for inversion is pumped through a boiler. The hot water causes the thermal set resin to cure within a few hours. After curing, lining 8 is a corrosion resistant, jointless pipe. During this process, impermeable lining 8 is inserted and expanded directly against felt layer 32. Felt layer 32 and liner 30 are used in this particular embodiment to protect the channels 24 and 26 and prevent resin from seeping into the area which will be ground water channel 6. Felt layer 32 is made of the same felt material as lining 8, and functions to absorb excess resin present during installation of lining 8. As illustrated, this method segregates existing pipe 2 into storm water channel/passageway 4 and ground water channel 6.

Referring now to FIG. 5, which is a cross-sectional view at joint 34 taken along line 5—5 of FIG. 1, in order to promote the inward flow of ground water, spaced apart holes 18 have been drilled or otherwise formed about the circumference of pipe 2 adjacent joint 34. Prior to installation, appropriate lengths and widths of drainage net 20 and liner 30 are tack welded together for convenience of installation. Drainage net 20 and liner 30 are secured to the inner circumference of existing pipe 2 at joint 34 with fasteners, such as TAPCON® Blue Max® self threading masonry anchors, and washers (not shown), with drainage net 20 disposed between liner 30 and pipe 2. Liner 30, which is wider than drainage net 20, is sealed with butyl rubber caulking to the inner surface of pipe 2 along each edge to prevent excess resin present during the installation of lining 8 from seeping into drainage net 20. Ground water which seeps through joints 34, or which flows through holes 18, flows along drainage net 20 about the outside circumference of lining 8 and liner 30 down to ground water channel 6. In the configuration shown, drainage net 20 under channels 24 and 26 allows an alternate flow path for ground water in the event that one of channels 24 or 26 becomes blocked. In such case, drainage net 20 would allow the ground water to flow therealong into the non-blocked adjacent inverted channel. Although as described in the preferred embodiment, ground water channel 6 is formed through the use of inverted channels 24 and 26, the method of the present invention encompasses any means for establishing the necessary effective flow area for ground water channel 6 outside of lining 8 within existing pipe 2. Ribs 24a and 26a may also be omitted, although they provide rigidity to channels 24 and 26.

Throughout the existing storm sewer system, there are typically manholes which form intersections between various segments of existing storm sewer pipes. The bottom of such manholes may be flat or curved. The storm water flow may be redirected. At such junctions, it is necessary to make sure that the ground water channel within one segment of the existing storm sewer pipe is in fluid communication with the ground water channel within a subsequent segment of the existing storm sewer pipe, remaining segregated from the storm water channel/passageway. It is further necessary to breach lining 8 to allow commmingling of storm water discharge from tributary storm sewer pipes. Grouting is necessary to prevent storm water from entering ground water channel 6, and to provide a smooth base to the invert of pipe 2 so as to prevent erosion during high flow and puddling during low flow. FIGS. 6–12 show specific embodiments used for different manhole configurations and conditions. These illustrative FIGS. are not exhaustive with respect to the application of the present invention to manholes and other intersections or pipe configurations.

Referring to FIG. 6, an exemplary beginning of ground water channel 6 within existing pipe 2 is diagrammatically illustrated. At the beginning, in order to segregate storm water channel passageway 4 from ground water channel 6, end 6a of ground water channel 6 is sealed by grout 36 which also provides a smooth transition for the storm water flowing into storm water channel/passageway 4. In the preferred embodiment, the grout used was Sika Top-123 high build polymer modified portland cement repair mortar. In the preferred embodiment, a grouting adhesive was used to provide a good surface bonding at each location where grout was placed. In particular, Sika DUR 32 Hi-Mod high strength grouting adhesive was used.

Within manhole areas, the upper portion of the lining is removed to allow the collection of storm flow from any lateral storm sewer pipes terminating at the manhole. For example, FIG. 7 is a diagrammatic side fragmentary view of existing pipe 2 intersecting with smaller existing pipe 38 at manhole 40. A portion of lining 8 has been removed leaving edges 8a and 8b. FIG. 8 is a cross-sectional view taken along line 8—8 of FIG. 7, illustrating more clearly lining 8 and edges 8a and 8b. In this illustration, existing lateral pipe 42 terminates at manhole 40 at an elevation higher than existing pipe 2. Because of this elevation, edge 8a extends upward from the invert of storm water channel/passageway 4. In order to direct any storm water coming from existing lateral pipe 42 into storm water channel/passageway 4, grout 44 is placed above existing bottom 46 of manhole 40.

On the right side of FIG. 8, existing pipe 38 is illustrated as entering manhole 40 at a low elevation, such that edge 8b of lining 8 must be relatively low. In order to direct the flow of storm water into storm water channel/passageway 4, grout 48 is placed following the contour of edge 8b in FIG. 8 as shown.

FIG. 9 is an enlarged fragmentary view showing the construction of ground water channel 6 in a typical flat bottom manhole. In such an instance, the existing manhole bottom may not provide a suitable foundation or area of contact to allow lining 8 to encapsulate ground water channel 6 effectively. The presence of storm sewer laterals may exacerbate this situation. In this situation, ground water channel 6 is encapsulated with grout 48 prior to installation of lining 8. Grout 48 is applied as necessary to create a tapered surface from the top of ground water channel 6 to the existing manhole bottom. Grout 48 surrounds channels 24 and 26, establishing the top and edges of ground water channel 6, and also keeps the resin used in setting lining 8 from encroaching into ground water channel 6. Referring now to FIG. 10 there is shown a cross-sectional view of storm water channel/passageway 4 passing through manhole 50 (partially shown), in which a substantial portion of the circular shape is maintained. Grout 52 is used to provide a gradual transition into the upper edges of lining 8.

FIG. 11 is a plan view of existing manhole 54 which was adapted to have sump 10 disposed therein. It should be kept in mind that FIG. 11 illustrates a specific manhole embodiment, which for example includes abandoned storm sewer lateral 55, and other manhole configurations exist in which the sump may be located. Existing bottom 56 (see FIG. 12) of manhole 54 is substantially flat. In manhole 54, storm water is directed through an approximate 90° turn by turn vane 60, while segregated ground water channel 6 is routed into sump 10.

Referring to FIG. 12, sump 10 is an impermeable container which, in the preferred embodiment, is prefabricated HDPE. Sump 10 is located to receive the discharge of ground water from ground water channel 6. Sump 10 is located at or near the end of the storm sewer system. A plurality of sumps may be used throughout the storm sewer system if necessary, providing a plurality of ground water collection points. In the preferred embodiment a single sump was used. The size (including the aspect ratio, diameter to depth) of sump 10 is dictated by the ground water flow rate, sump pump capacity and the manhole access opening.

Sump 10 is located in an existing manhole by forming a suitably sized hole 62 through and below manhole bottom 56. Grout 64 (Sika Top-111) is placed in hole 62, surrounding sump 10. A portion of sump 10 extends above the level of manhole bottom 56 and is enclosed by cover 68, to keep storm water from entering sump. In order to provide for displacement of air within sealed sump 10, vent pipe 70 is disposed through the side wall of sump 10, extending upwardly to a height sufficient to preclude storm water from entering vent pipe 70. The sidewall of sump 10 is sealed where vent pipe 70, as well as where ground water channel 6, enter.

Ground water channel 6 and drainage net 20 extend across manhole bottom 56, encapsulated by grout 58 (Sika Top-123). Formed cradle 58a is also made of grout 58, to accommodate construction of turn vane 60, as described below. Alternatively, an HDPE liner may be disposed below channels 24 and 26. HDPE liner 30 and felt layer 32 overlay channels 24 and 26, extending to base 60b of turn vanes 60. Lining 8 overlays felt layer 32, and extends to the upper edge of turn vane 60. Turn vane 60 is constructed of brick and mortar above formed cradle 58a to redirect storm water flow 90° to the down stream lateral. A coating 60a of Sika Top-123 is applied to the brick and mortar to form a substantially smooth surface.

Collected ground water is removed from sump 10 by, for example, a submersible pump (not shown) or other appropriate means, and delivered by a pipe (see arrow 14 of FIG. 1) to a treatment unit. An appropriate level sensor, such as a float, may be used to activate the pump as necessary.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of collecting groundwater using an existing underground pipe having an interior surface defining an interior passageway, comprising the steps of:

(a) disposing at least one generally U-shaped channel within said interior passageway, said interior surface having an invert, said channel opening toward said invert of said interior surface;

(b) inserting a flexible lining within said interior passageway;

(c) hardening said lining in situ into a rigid lining;

(d) using the inside surface of said lining to define an interior storm water passageway;

(e) defining a groundwater passageway between said lining and said interior surface of said pipe;

(f) utilizing said lining to fluidically isolate said storm water passageway from said groundwater passageway;

(g) forming at least one fluid passageway between said groundwater passageway and the environment surrounding said pipe;

(h) interposing a drainage net between said interior surface of said pipe and said lining extending therebetween from said at least one fluid passageway to said channel; and (i) defining by means of said drainage net a plurality of flow passageways between said at least one fluid passageway and said channel.

2. The method of claim 1, wherein said lining is a resin impregnated lining, and including the step of hardening said lining by curing said resin.

3. The method of claim 1, comprising the step of interposing a water impermeable layer between said lining and said channel.

4. The method of claim 1, wherein said pipe comprises individual aligned segments having joints at the interfaces between adjoining segments, and including the step of forming said at least one fluid passageway adjacent at least one joint.

* * * * *